United States Patent [19]
Lewin

[11] Patent Number: 5,807,035
[45] Date of Patent: Sep. 15, 1998

[54] CLAMP FOR DRILL PRESS

[76] Inventor: Howard S. Lewin, 625 35th St., Manhattan Beach, Calif. 90266

[21] Appl. No.: 546,531

[22] Filed: Oct. 20, 1995

[51] Int. Cl.[6] .................................................. B23B 47/00
[52] U.S. Cl. ............................................. 408/95; 408/103
[58] Field of Search ............................... 408/95, 97, 103, 408/110, 112

[56] References Cited

U.S. PATENT DOCUMENTS

| | | | |
|---|---|---|---|
| 1,595,674 | 8/1926 | Marshall | 408/95 |
| 1,701,644 | 2/1929 | Stull . | |
| 2,269,727 | 1/1942 | Mead . | |
| 2,629,411 | 2/1953 | Jones . | |
| 2,877,672 | 3/1959 | Roberts | 408/97 |
| 3,185,470 | 5/1965 | Zitner . | |
| 3,192,801 | 7/1965 | Gingras | 408/97 |
| 3,707,043 | 12/1972 | Jones . | |
| 4,281,949 | 8/1981 | Bugarin . | |
| 4,749,314 | 6/1988 | LeBlond . | |
| 4,872,787 | 10/1989 | Arai et al. . | |
| 5,102,270 | 4/1992 | Warren . | |

FOREIGN PATENT DOCUMENTS

| | | | |
|---|---|---|---|
| 2427083 | 12/1975 | Germany | 408/95 |
| 244403 | 10/1986 | Japan | 408/95 |
| 141850 | 6/1988 | Japan | 408/95 |
| 109010 | 4/1989 | Japan | 408/95 |
| 222808 | 9/1989 | Japan | 408/95 |
| 243210 | 9/1990 | Japan | 408/95 |

*Primary Examiner*—Daniel W. Howell
*Attorney, Agent, or Firm*—Lyon & Lyon LLP

[57] ABSTRACT

A clamp for a drill press includes a perpendicular support which can be attached to the quill of the drill press. The perpendicular support holds a compression spring which in turn is connected to an extension having a foot for engaging the work piece. As the quill is moved toward the work piece, the foot engages the work piece and the spring exerts a holding force during the drilling operation.

13 Claims, 6 Drawing Sheets

5,807,035

CLAMP FOR DRILL PRESS

BACKGROUND OF THE INVENTION

1. Field of the Invention

The present invention relates to a clamp for a drill press, and more specifically, to such a clamp which can be readily attached and removed from the drill press and which automatically engages the work piece being drilled.

2. Description of the Related Art

Various types of clamps exist for clamping a work piece to the table of a drill press. Generally, these clamps can be classified as manual clamps and automatic clamps. An example of a manual clamp is shown in U.S. Pat. No. 5,102,270. With such a manual clamp, the drill press operator must position the work piece, clamp the work piece into place, and then drill the work piece. On the other hand, automatic drill press clamps, such as that shown in U.S. Pat. No. 1,701,644, allow a positioned work piece to be clamped and drilled in one step. Automatic clamps, however, tend to be specialized for particular drilling operations and not readily or universally adaptable to other drill press applications. A need exists for a drill press clamp which is automatic, easy to use, and readily adaptable to a wide variety of drill press applications.

SUMMARY OF THE INVENTION

The present invention overcomes the problems and disadvantages of the prior art by providing a drill press clamp which is easy to install, easy to use, adaptable to a wide variety of drill press operations, and which operates automatically. In this way, the present invention allows increased productivity, as well as decreased manual manipulation of the work piece and thus increased safety. Additional objects and advantages of the invention will be set forth in part in the description which follows, and in part will be obvious from the description or may be learned by practice of the invention. The objects and advantages of the invention will be realized and attained by means of the elements and combinations particularly pointed out in the appended claims.

To achieve the objects, and in accordance with the purpose of the invention, as embodied and broadly described herein, the invention comprises a clamp for clamping a work piece to a table of a machine tool, the machine tool having a quill which is movable in a direction toward the table, the clamp comprising: attachment means for detachably securing the clamp to the quill; a perpendicular support extending from the attachment means in a direction perpendicular to the direction of movement of the quill; compression means for exerting a force in the direction of the movement of the quill; holding means associated with the perpendicular support for securing the compression means to the perpendicular support; and engagement means extending from the compression means for engaging the work piece and for compressing the compression means. In a preferred embodiment, the holding means comprises horizontal spacing means for spacing the compression means a variable distance from the attachment means. In a further preferred embodiment, the compression means comprises a spring.

It is to be understood that both the foregoing general description and the following detailed description are exemplary and explanatory only and are not restrictive of the invention as claimed.

BRIEF DESCRIPTION OF THE DRAWINGS

The accompanying drawings which are incorporated in and constitute part of the specification, illustrate one embodiment of the invention and, together with the description, serve to explain the principles of the invention.

DESCRIPTION OF THE PREFERRED EMBODIMENT

Reference will now be made in detail to the presently preferred embodiment of the invention, an example of which is illustrated in the accompanying drawings. Wherever possible the same reference numbers will be used throughout the drawings to refer to the same or like parts.

Figure 1A:
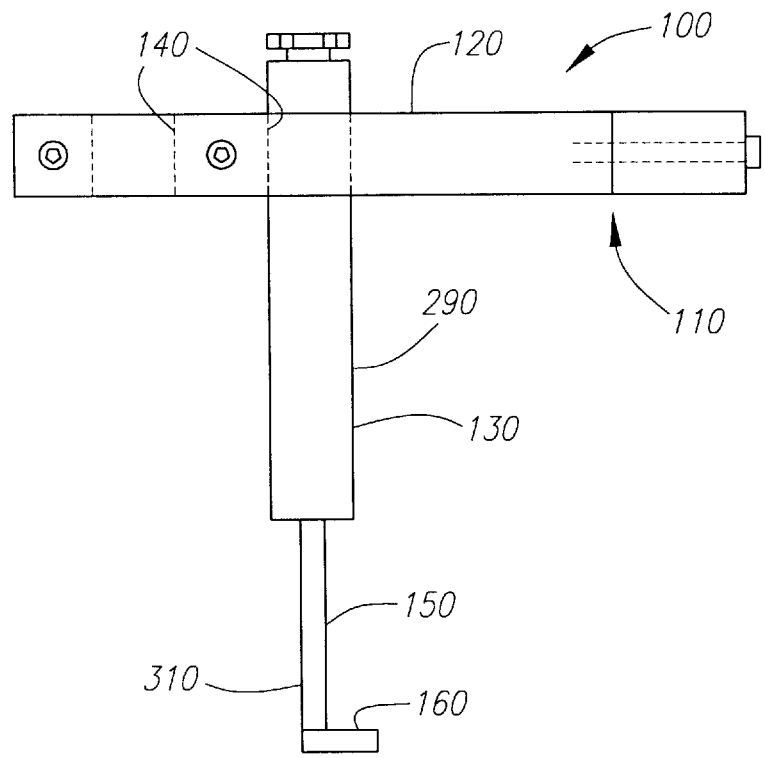
FIG. 1A shows a side view of the drill press clamp of the present invention.
Figure 1B:
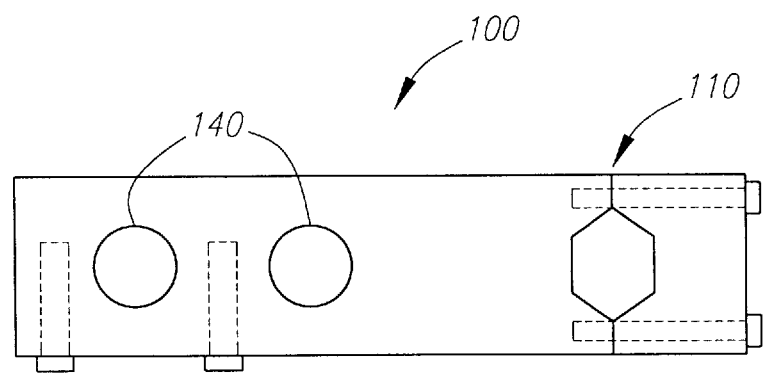
FIG. 1B is a top view of the horizontal support of the drill press clamp of the present invention.

FIG. 1A depicts a drill press clamp 100 of the present invention. Clamp 100 includes an attachment portion 110 for allowing the clamp to be attached and detached from the quill of a drill press. In a preferred embodiment, attachment portion 110 formed from a portion of a perpendicular support 120. The perpendicular support extends horizontally from the quill of the drill press when attachment portion 110 is connected to the drill press quill. Clamp 100 also includes a compression member 130 capable of generating a force when subject to compression. Compression member 130 is secured to perpendicular support 120 by a holding portion 140 formed in the perpendicular support. Finally, clamp 100 has an engagement member 150 which extends from compression member 130 to engage a work piece on the table of the drill press. In a preferred embodiment, engagement member 150 may include a foot 160.

A preferred embodiment of the invention will now be discussed with reference to FIG. 2A. Perpendicular support 120 may be machined (e.g., from aluminum) or alternatively cast (e.g., from iron). Other methods of manufacturing the perpendicular support, for example from composite materials, will readily be envisioned by those in the art.

In a preferred embodiment, attachment portion 110 is formed in one end of perpendicular support 120 by cutting the support along divide 170 and by machining or otherwise forming an opening 180 in support 120. Opening 180 is sized so that it can fit around the quill of a drill press. Attachment portion 110 may then be placed around the quill of a drill press so that end piece 190 is connected to perpendicular support 120 by bolts 200.

In a preferred embodiment, holding portion 140 is also formed in perpendicular support 120 by machining or otherwise forming holes 210, through which compression member 130 can be inserted. In addition to holes 210, split 220 is formed in the support 120 thereby allowing holes 210 to be spread open or compressed. Once compression member 130 is placed in a hole 210, the hole is compressed using bolts 230 to secure compression member 130 to perpendicular support 120. Multiple holes 210 may be formed in support 120 to allow compression member 130 to be secured at variable distances from attachment portion 110.

Figure 6:
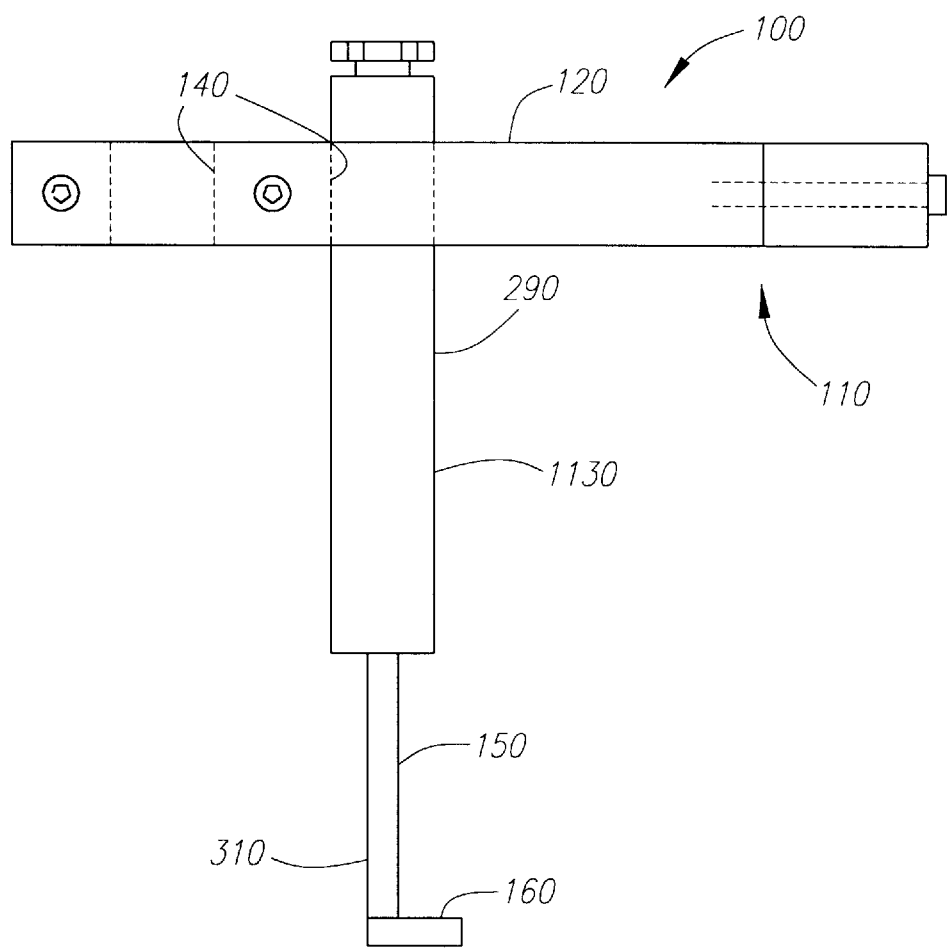
FIG. 6 shows a side view of an alternative embodiment of the drill press clamp of the present invention.

In a preferred embodiment, compression member 130 comprises spring 240. The spring constant of spring 240 may be varied depending upon the application envisioned. For example, as presently envisioned, a spring force of 80 pounds per inch is believed preferable for drilling wood, while a spring force of 100 pounds per inch is believed preferable for drilling metal. Alternative compression members 1130 (depicted in FIG. 6) will be readily envisioned by those skilled in the art, for example, a gas or fluid filled chamber. Such a gas or fluid filled chamber may also include a valve for further pressurizing or depressurizing the chamber (for example using compressed air).

Figures 2A, 2B:
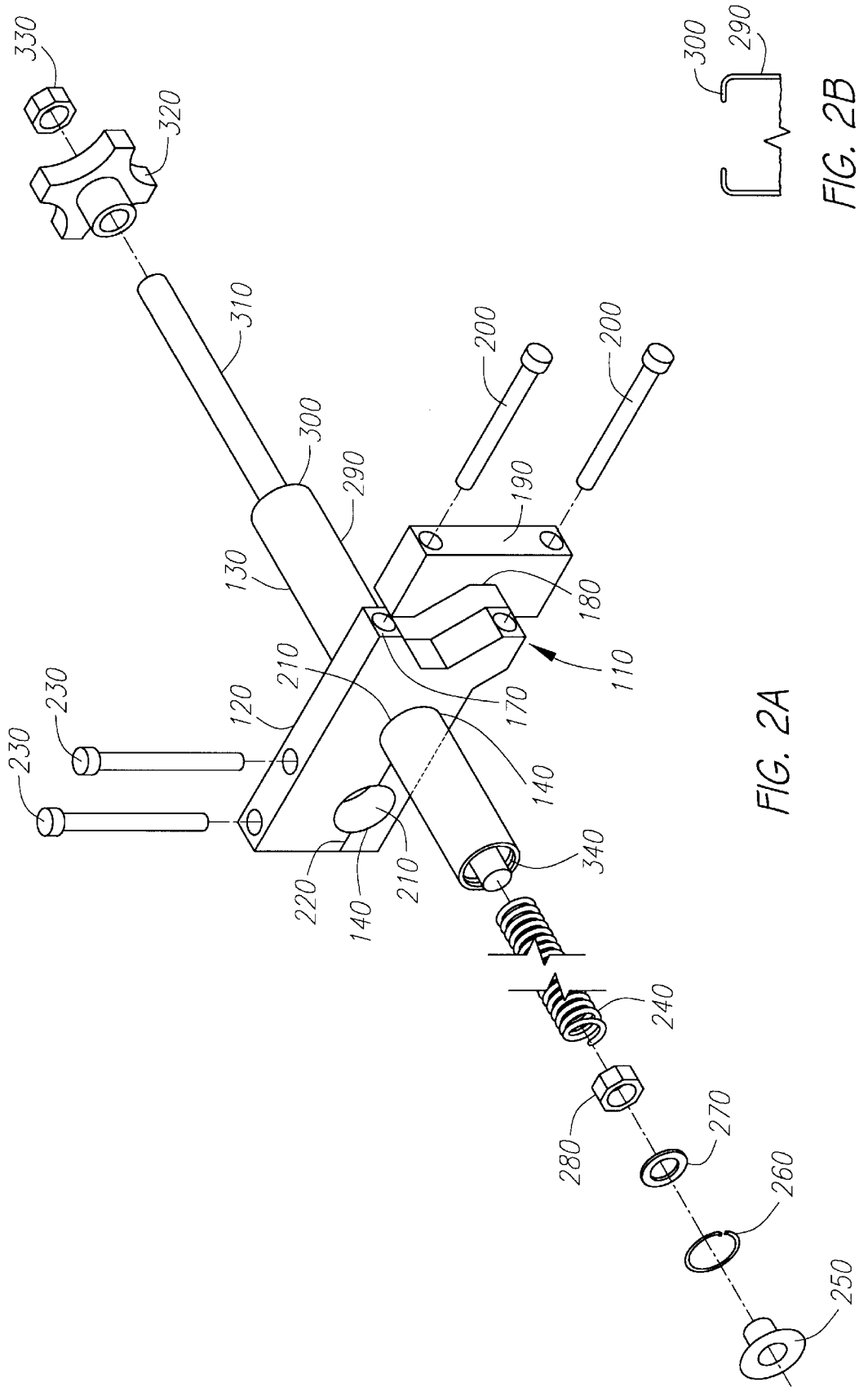
FIGS. 2A and 2B are an exploded perspective view of the drill press clamp of the present invention.

In a preferred embodiment, compression member 130 further includes a cylinder 290 having end 300 upon which spring 240 rests when inserted into the cylinder, as best shown in FIG. 2B. As before, cylinder 290 may be machined or cast, as will be readily apparent to those skilled in the art. Threaded shaft 310 passes through a hole in end 300, through cylinder 290 and through spring 240. An extension stop is created using nut a 280 and a washer 270 which are placed on threaded shaft 310. Alternatively, a combination nut/washer may be used instead of nut 280 and washer 270. Spring 240 is placed entirely within cylinder 290 and secured by a snap ring 260 is placed in groove 340 formed in the inner surface of cylinder 290. An adjustment knob 320 is threaded onto one end of shaft 310 and secured by lock nut 330. Spring 240 may be pre-compressed by turning adjustment knob 320.

In a preferred embodiment, the portion of shaft 310 extending opposite adjustment knob 320 forms engagement member 150, as best shown in FIG. 1A. A knurled knob 250 is threaded onto the end of shaft 310. Knurled knob 250 can act as a foot against the work piece or as a lock nut if a separate foot 160 is also threaded onto the end of shaft 310.

In a preferred embodiment, as can be seen in FIG. 1A, foot 160 is attached to the end of threaded shaft 310. Foot 160 may have a flat bottom, be shaped to fit a particular work piece, or be of resilient material capable of conforming to a work piece. Additionally, depending on the application, a friction material may be applied to the bottom of foot 160 to enhance the coefficient of friction between the foot and the work piece.

Figure 3:
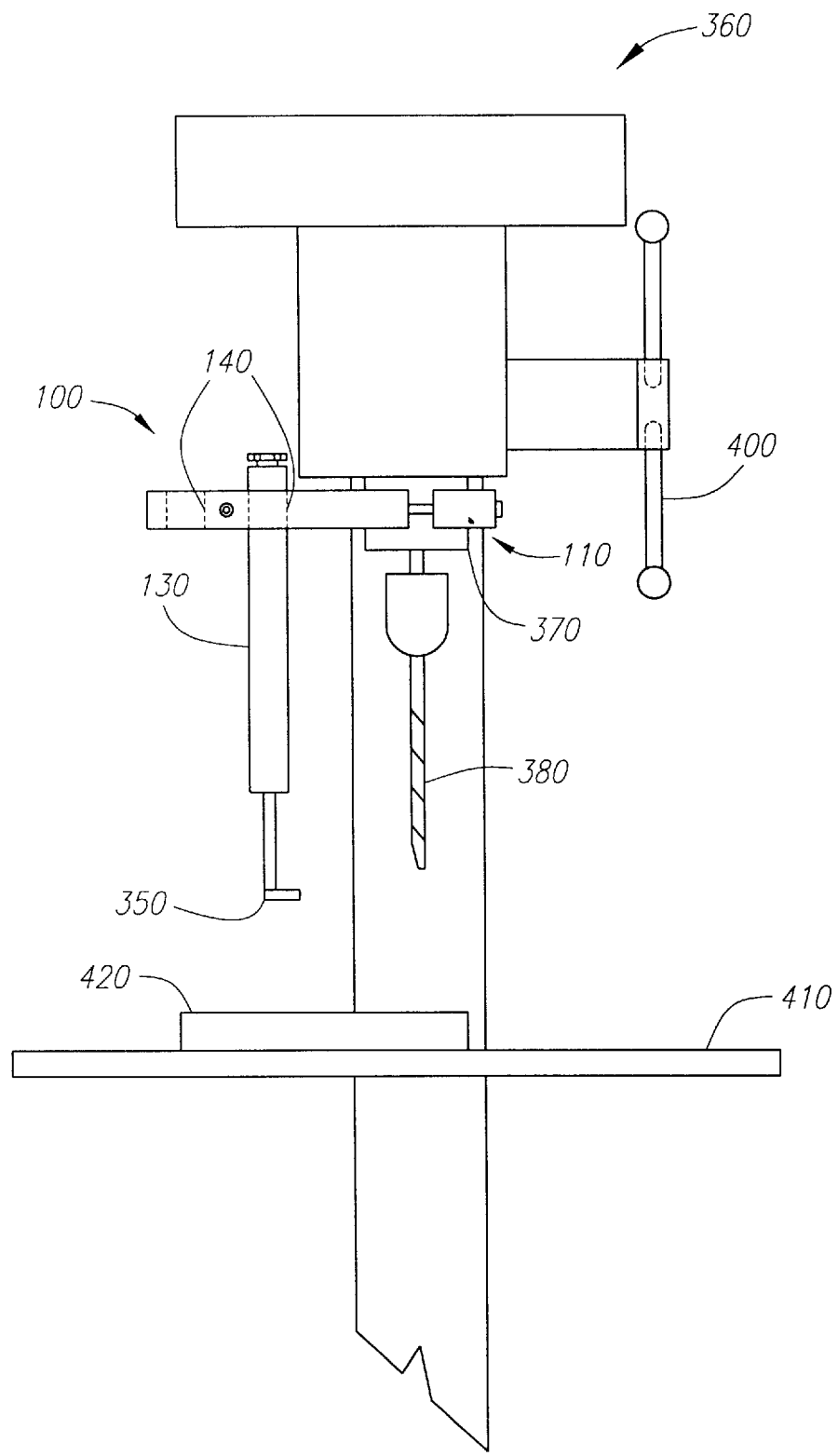
FIGS. 3–5 depict the drill press clamp of the present invention in operation.
Figure 4:
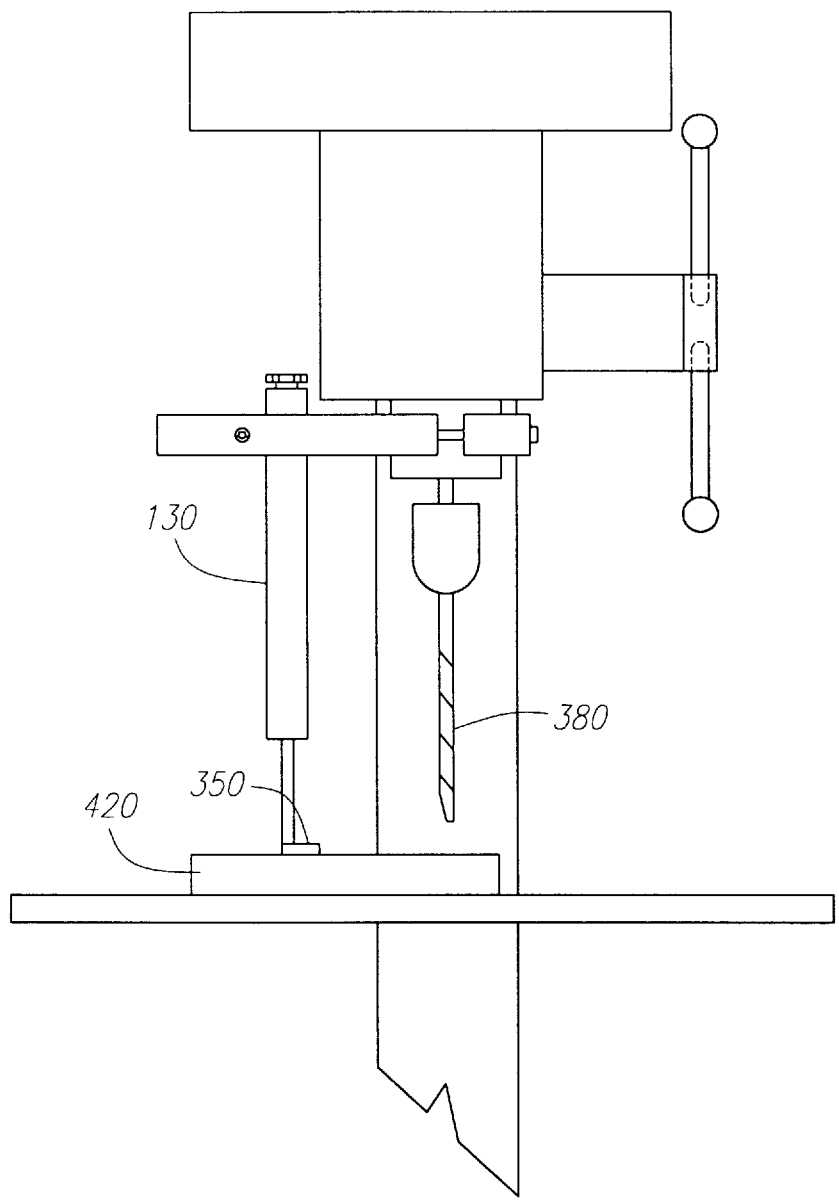
Figure 5:
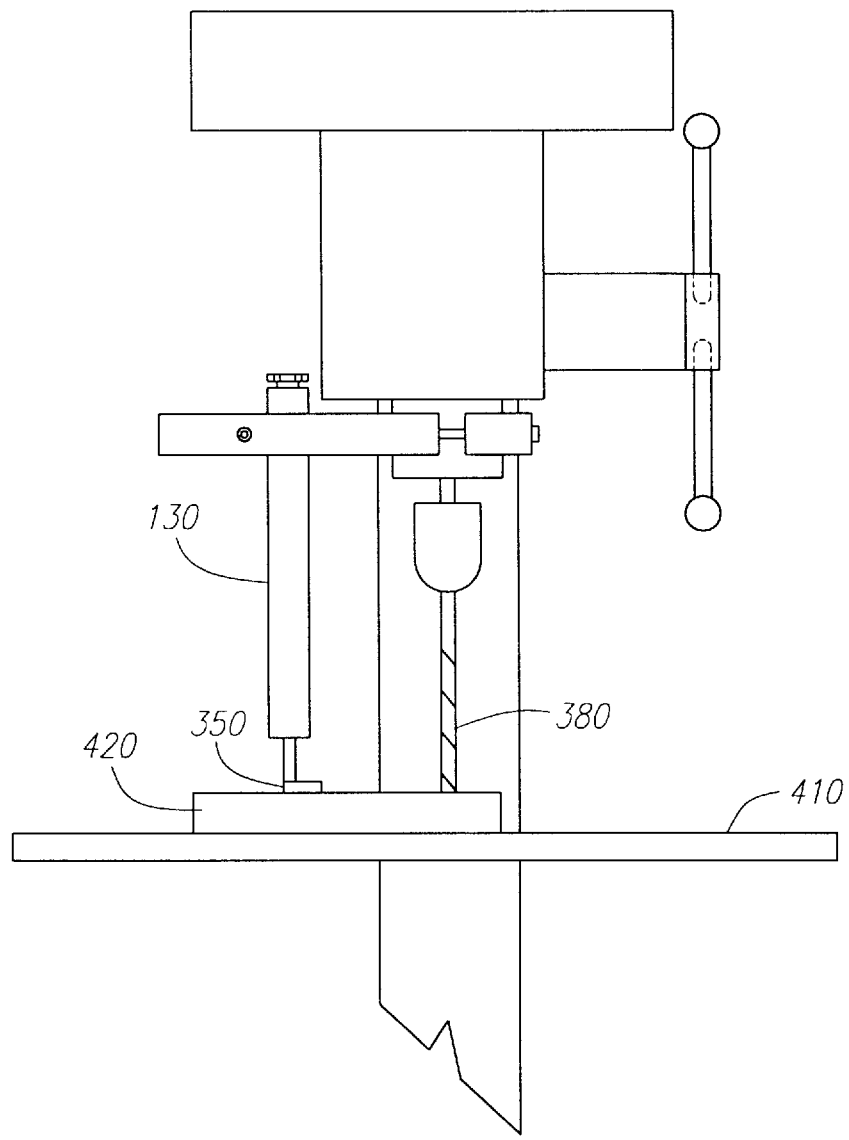

The operation of clamp 100 is depicted in FIGS. 3–5. A drill press 360 has a quill 370, drill bit 380, a wheel 400 for raising and lowering the quill and drill bit, and a table 410 upon which a work piece 420 can be placed. Clamp 100 is attached to quill 370 using attachment portion 110, as previously described. Compression member 130 is placed in holding portion 140 at a desired distance from the quill. As shown in FIG. 4, as drill bit 380 is lowered toward work piece 420, foot 160 engages the work piece and compression member 130 is compressed, thereby exerting a holding force between foot 160 and work piece 420. As shown in FIG. 5, drill bit 380 is lowered into work piece 420 and foot 160 continues to engage the work piece further compressing compression member 130 and increasing the holding force. In this manner, after positioning the work piece, the drill press operator need not manually hold work piece 420 during the drilling operation. Not only does the clamp of the invention thereby reduce the chance of operator injury, but it also provides a uniform and automatic holding force which can decrease the time required for drilling and reduce incidences of slippage and material waste.

It will be apparent to those skilled in the art that other modifications and variations can be made in the drill press clamp of the present invention and in the construction of this drill press clamp without departing from the scope or spirit of the invention. For example, a clamp as described herein may readily be used on other machine tools which have a quill or equivalent part which travels toward a work piece that rests on a table.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. a clamp for clamping a work piece to a table of a machine tool, the machine tool having a quill which is movable in a direction toward the table, the clamp comprising:

attachment means for detachably securing the clamp to the quill in variable directions perpendicular to the direction of movement of the quill;

a perpendicular support extending from the attachment means in one of the variable directions perpendicular to the direction of movement of the quill;

compression means for exerting a force in the direction of the movement of the quill;

holding means associated with the perpendicular support for securing the compression means to the perpendicular support;

engagement means extending from the compression means to a variable engagement position for engaging the work piece and for compression the compression means; and adjustment means for adjusting the force exerted by the compression means independent of the engagement position.

2. A clamp as claimed in claim 1, wherein the holding means comprises perpendicular spacing means for spacing the compression means a variable distance from the attachment means.

3. A clamp as claimed in claim 2, wherein the compression means comprises a spring.

4. A clamp as claimed in claim 3, wherein the spring exerts a force of approximately 80 lbs. per inch of compression.

5. A clamp as claimed in claim 3, wherein the spring exerts a force of approximately 100 lbs. per inch of compression.

6. A clamp as claimed in claim 2, wherein the compression means comprises a fluid filled chamber.

7. A clamp as claimed in claim 2, wherein the compression means comprises an elongated member having a uniform circular cross-section section of a predetermined size and the holding means comprises openings in the perpendicular support having approximately the same cross-section and size as the uniform circular member.

8. A clamp as claimed in claim 3, wherein the adjustment means comprises means for pre-compressing the spring.

9. A clamp as claimed in claim 1, wherein the engagement means comprises a foot shaped to engage the work piece.

10. A clamp as claimed in claim 9, wherein a material having a high coefficient of friction is attached to a portion of the foot.

11. A clamp as claimed in claim 9, wherein the foot is made from resilient material.

12. A clamp for clamping a workpiece to a table of a machine tool, the machine tool having a quill which is movable in a direction toward the table, the clamp comprising:

attachment means for detachably securing the clamp to the quill;

a perpendicular support extending from the attachment means in a direction perpendicular to the direction of movement of the quill;

compression means for exerting a force in the direction of the movement of the quill, wherein the compression means comprises an elongated member having a uniform circular cross-section of a predetermined size;

holding means associated with the perpendicular support for securing the compression means to the perpendicular support, wherein the holding means comprises perpendicular spacing means for spacing the compression means a variable distance from the attachment means including openings in the perpendicular support having approximately the same cross-section and size as the uniform circular member; and engagement means extending from the compression means for engaging the work piece and for compressing the compression means.

13. A clamp for clamping a work piece to a table of a machine tool, the machine tool having a quill which is movable in a direction toward the table, the clamp comprising:

attachment means for detachably securing the clamp to the quill;

a perpendicular support extending from the attachment means in a direction perpendicular to the direction of movement of the quill;

compression means for exerting a force in the direction of the movement of the quill;

holding means associated with the perpendicular support for securing the compression means to the perpendicular support; and engagement means extending from the compression means for engaging the work piece and for compressing the compression means, wherein the engagement means comprises a foot shaped to engage the work piece, wherein a material having a high coefficient of friction is attached to a portion of the foot, and wherein the foot is made from resilient material.

\* \* \* \* \*